United States Patent
Kohchi et al.

(10) Patent No.: US 6,779,725 B2
(45) Date of Patent: Aug. 24, 2004

(54) IMAGE READER AND IMAGING APPARATUS CAPABLE OF REDUCING VIBRATION AND FLUCTUATION IN IMAGE READING

(75) Inventors: Masashi Kohchi, Tokyo (JP); Masaru Watanabe, Tokyo (JP); Tomoaki Suga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/162,615

(22) Filed: Jun. 6, 2002

(65) Prior Publication Data

US 2003/0006284 A1 Jan. 9, 2003

(30) Foreign Application Priority Data

Jun. 7, 2001  (JP) ........................................ 2001-172040

(51) Int. Cl.[7] ................................................ G06K 7/10
(52) U.S. Cl. ............. 235/454; 235/462.01; 235/462.42; 235/462.43; 235/470; 235/375; 358/483
(58) Field of Search ........................... 235/454, 462.41, 235/462.42, 462.43, 470; 358/483

(56) References Cited

U.S. PATENT DOCUMENTS 5,075,539 A * 12/1991 Shiraishi ..................... 250/208
5,267,089 A * 11/1993 Yamamoto et al. ......... 359/822
5,933,248 A * 8/1999 Hirata ......................... 358/406
6,239,885 B1 * 5/2001 Sato et al. ................... 358/483

FOREIGN PATENT DOCUMENTS

| JP | 9-244156 | | 9/1997 | |
|----|----------|---|--------|---|
| JP | 10-126573 | | 5/1998 | |
| JP | 2001-166396 | * | 6/2001 | ........... G03B/27/50 |

* cited by examiner

*Primary Examiner*—Steven S. Paik
(74) *Attorney, Agent, or Firm*—Oblon, Spivak, McClelland, Maier & Neustadt, P.C.

(57) ABSTRACT

An image reader comprises a light source illuminating an original, an optical guide system configured to guide a light beam reflected from the original and conveying information about an image on the original, a light-receiving unit configured to receive the light beam guided by the optical guide system and to convert the information about the image into electric signals, a stay member holding the light-receiving unit, a balance weight configured to act on the stay member and to reduce oscillation of the light-receiving unit, and a balance-weight holding structure configured to hold the balance weight in an unrestrained state with respect to the stay member.

25 Claims, 8 Drawing Sheets

$L_1 \fallingdotseq L_2$
$l_1 \fallingdotseq l_2$ (DIRECTION OF EXTENSION)

$L_1 \fallingdotseq L_2$
$l_1 \fallingdotseq l_2$

IMAGE READER AND IMAGING APPARATUS CAPABLE OF REDUCING VIBRATION AND FLUCTUATION IN IMAGE READING

BACKGROUND OF THE INVENTION

1. Field of the Invention

The present invention relates to an image reader (such as an image scanner) and an imaging apparatus (such as a digital photocopier or a facsimile machine) for producing an image based on the outputs from the image reader, which are capable of reducing vibration and fluctuation due to a shaking of or an impact externally applied to the light receiving elements of the image reader.

2. Description of the Related Art

In general, an image reader furnished in currently used image scanners or digital photocopiers scans-original images using a light beam. The light image reflected from the original is received, via an optical transfer system, at the light-receiving unit, and then it is converted to electric signals. The light-receiving unit generally includes an imaging lens, an image sensor, and a circuit board for processing the output from the image sensor.

To assemble the light-receiving unit into an image reader, the components constituting the light-receiving unit are optically arranged and held on a stay member (that is, a base), and the stay member holding the components on it is attached to the frame of the image reader. The structural unit including the stay member is referred to as a light-receiving block.

In general, the stay member is a long and narrow plate. Accordingly, with external vibration or impact propagating through the frame of the image reader to the light-receiving block, oscillation is likely to occur in the vertical direction with both ends of the stay member as nodes attached to a frame. The light-receiving block swings as the stay member bends, and the position of the image sensor relative to the scan beam reflected from the original changes. This results in the output images from the sensor fluctuating.

To overcome this problem, it has been proposed to provide a balance weight to the stay member (or the optical block) to restrain vibration and swinging.

FIG. 1A illustrates a conventional light-receiving block furnished with a balance weight 114. Both ends of the long stay plate 109 are attached to the frame 110 of an image reader, and a light-receiving unit comprising a lens 107 and an image sensor 108 is placed in the middle of the stay plate 109. A balance weight 114 is fixed to the rear face of the stay plate 109 corresponding to the loading position of the light-receiving unit. With external shake or impact, the light-receiving unit slightly oscillates in the directions indicated by the arrow.

Since the balance weight 114 changes the characteristics of the oscillating system, the oscillation frequency is reduced as compared with a light-receiving block elastically held by the frame 110 without the balance weight 114. The oscillation amplitude is also reduced to a certain extent.

A similar known technique for reducing the oscillation of the light-receiving unit of an image reader is to reduce the amplitude of the resonant vibration of the base plate of the image reader, on which a light-receiving unit is attached. With this technique, a balance weight is fixed to the base plate via an elastic material to absorb the vibration due to the resonance of the base plate.

However, providing a balance weight to the long and narrow stay plate 109 as shown in FIG. 1A is insufficient for the trend toward high image quality because the long plate easily oscillates with large amplitude.

Another problem in the conventional structure is shown in FIG. 1B, which is a cross-sectional view taken along the C—C line in FIG. 1A. The center of gravity of the light-receiving block resides at point G, which is offset from the stay plate 109. Due to this imbalance, the light-receiving block swings in the mode to which the rotation about the axis passing through fulcrums (i.e., both ends of the stay plate 109) is added, as indicated by the curved arrow in FIG. 1B. Consequently, the balance weight 114 can not sufficiently reduce the vibration and swinging. This adversely affects the quality of the sensor output.

SUMMARY OF THE INVENTION

The present invention was conceived to overcome the above-described problems in the prior art techniques concerning oscillation and swinging due to shaking or impact externally applied to the light-receiving unit of an image reader. It is one of the objects of the invention to realize reliable damping of undesirable oscillation and swingig with a simple structure even if a long and narrow stay plate is used to hold the light-receiving unit. Such an oscillation reducing (or a damping) structure is applicable to an image reader (e.g., an image scanner) and an imaging apparatus (e.g., a digital photocopier or a facsimile machine).

To achieve the objective, in one aspect of the invention, an image reader comprises a light source illuminating an original, an optical guide system configured to guide a light beam reflected from the original and conveying information about an image on the original, a light-receiving unit configured to receive the light beam guided by the optical guide system and to convert the information about the image into electric signals, a stay member holding the light-receiving unit, a balance weight configured to act on the stay member and to reduce oscillation of the light-receiving unit, and a balance-weight holding structure configured to hold the balance weight in an unrestrained state with respect to the stay member.

In another aspect of the invention, an image reader comprises a light source illuminating an original, an optical guide system configured to guide a light beam reflected from the original and conveying information about an image on the original, a light-receiving unit configured to receive the light beam guided by the optical guide system and to convert the information about the image into electric signals, a stay member holding the light-receiving unit, the stay member and the light-receiving unit constituting a light-receiving block, and a balance weight provided to the stay member in an unrestrained manner and configured to bring the center of mass of the light-receiving block to the center along the longitudinal axis of the stay member.

Either of the above-described image readers is applicable to an imaging apparatus. In this case, stable and reliable output signals can be obtained from the image reader, and therefore, reproduced images have a high image quality without periodic streaks or fluctuations in the images.

BRIEF DESCRIPTION OF THE DRAWINGS

Other objects, features, and advantages of the invention will become more apparent from the following detailed description when read in conjunction with the accompanying drawings, in which:

FIG. 16 illustrates the shock absorbing (or vibration reducing) effect according to the invention, where FIG. 16A shows the oscillation of the light-receiving block with large peaks when an impact is applied externally to the conventional image reader, while

DETAILED DESCRIPTION OF THE EMBODIMENTS

Preferred embodiments of the image reader and the imaging apparatus will now be described in detail with reference to the attached drawings.

The image reader explained below may be used as a separate image scanner as it is, or alternatively, it may be applied to the reading unit of a digital photocopier or a facsimile machine, making use of the outputs of the image reader in generating a write signal to reproduce the original image.

First, an imaging apparatus in which an image reader is assembled as the reading unit will be explained using an example of a DPPC (Digital Plain Paper Copy-machine).

Figure 2:
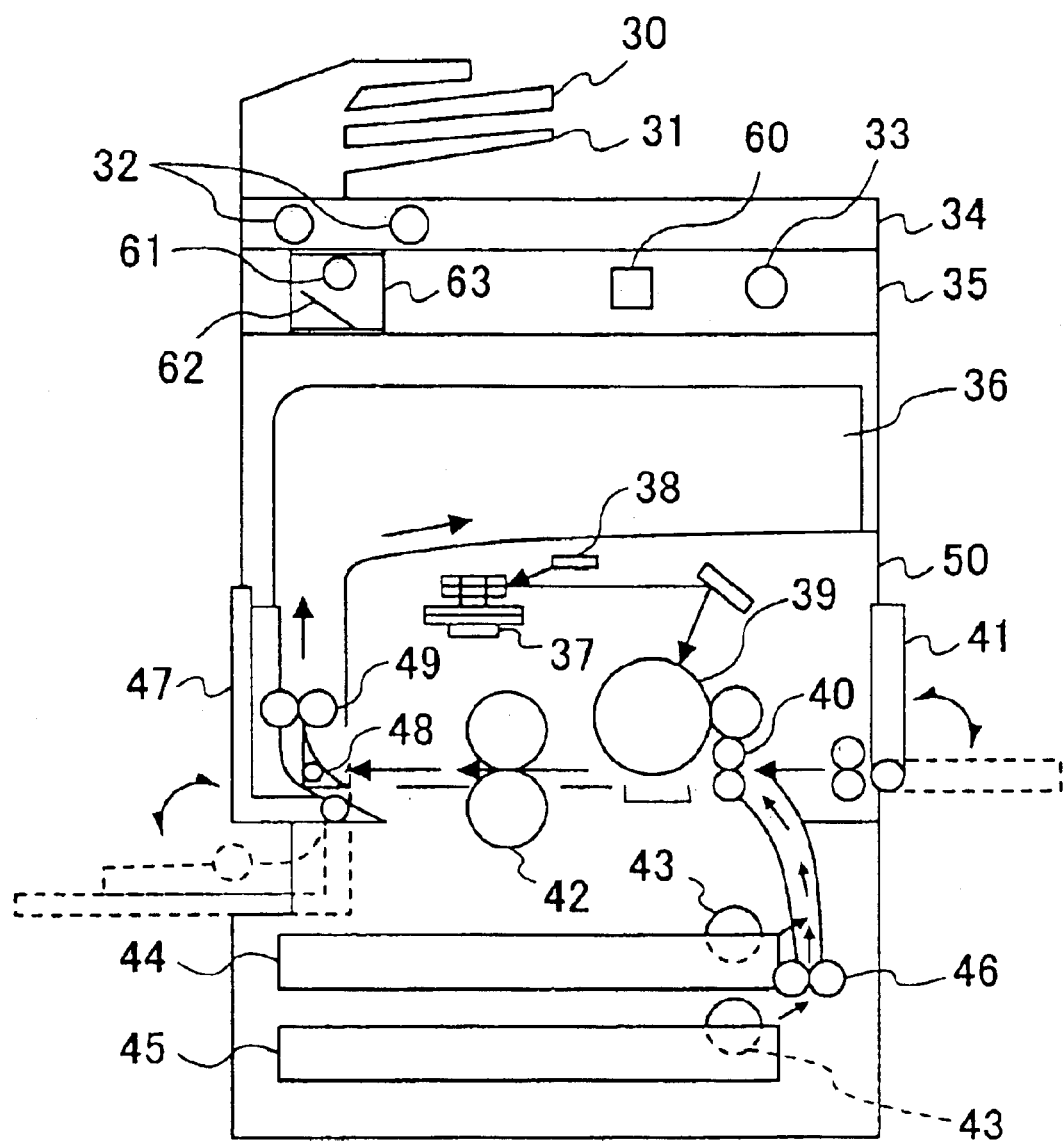
FIG. 2 schematically illustrates a DPPC (Digital Plain Paper Copy-machine) as an example of the imaging apparatus according to an embodiment of the invention.

FIG. 2 schematically illustrates a DPPC in which an image reader is incorporated. The DPPC roughly comprises an auto document feeder (ADF) 34, an image reading unit 35, an imaging unit 50, and an operation panel (not shown). ADF 34 includes an original feeding tray 30, a reversal tray 31, and an ADF driving motor 32. The ADF 34 transports the original to be copied to the reading position, and ejects the original from the reading position.

The image reading unit 35 includes a scan system 63, which has an exposure lamp 61 and a group of mirrors 62 on the carriage, a light-receiving unit 60 (including an imaging lens, an image sensor consisting of light-receiving elements, and a circuit board for processing the output from the image sensor), and a scanner driving motor 33. The image reading unit 35 is capable of working in both sheet-through mode and scanner sliding mode. In the sheet-through mode, the ADF 34 causes the original to move with respect to the light source during the scan. In the scanner sliding mode, the original loaded on the platen is scanned by moving the light source.

The imaging unit 50 transports transfer paper inside the housing to form the image read from the original onto transfer paper. The imaging unit 50 has an inside paper-ejecting chamber 36 for receiving photocopied transfer paper, a laser diode 38, a polygon motor/mirror 37 for reflecting the laser beam emitted from the laser diode 38, a photosensitive drum 39 on which an electrostatic latent image is formed by the laser beam, and resist rollers 40. The imaging unit 50 also includes a manual feed tray 41 for allowing transfer paper to be supplied manually, a fixing unit 42 for fixing the toner onto the transfer paper, a first paper cassette 44, a second paper cassettes 45, paper feed rollers 43 for feeding the transfer paper from the first and second cassette, and transport rollers 46 for further feeding the transfer paper fed from the paper feed rollers 43 to the resist rollers 40. The imaging unit 50 further includes a paper eject tray 47, a transport path switcher 48 for switching the paper ejecting route between the paper eject tray 47 and the inside paper-ejecting chamber 36, and feed rollers 49 for guiding the transfer paper to the inside paper-ejecting chamber 36.

The operation panel (not shown) allows the user to input various commands or to set up the operation mode through keys and buttons, and informs the user of the operational status of the apparatus.

Figure 1A:
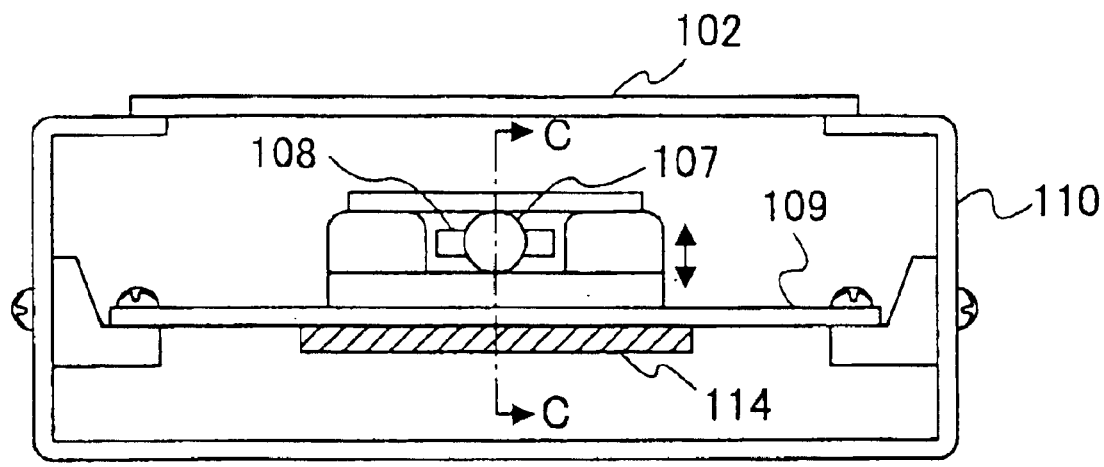
FIG. 1A illustrates a conventional light-receiving block with a balance weight.
Figure 1B:
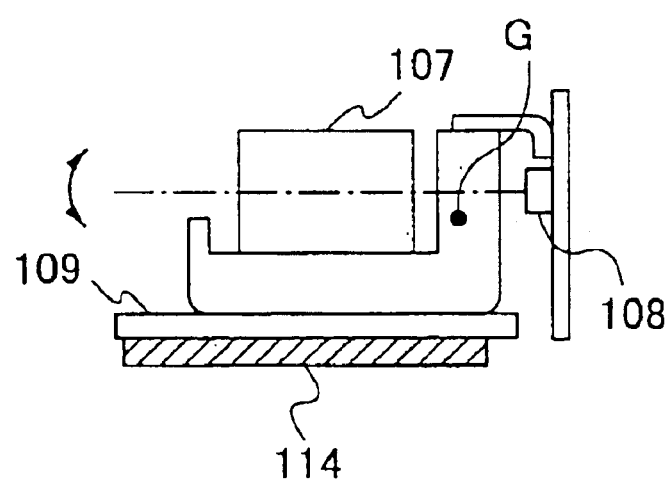
FIG. 1B is a cross-sectional view taken along the C—C line in FIG. 1A showing the center of mass of the light-receiving block offset from the stay plate.
Figure 3:
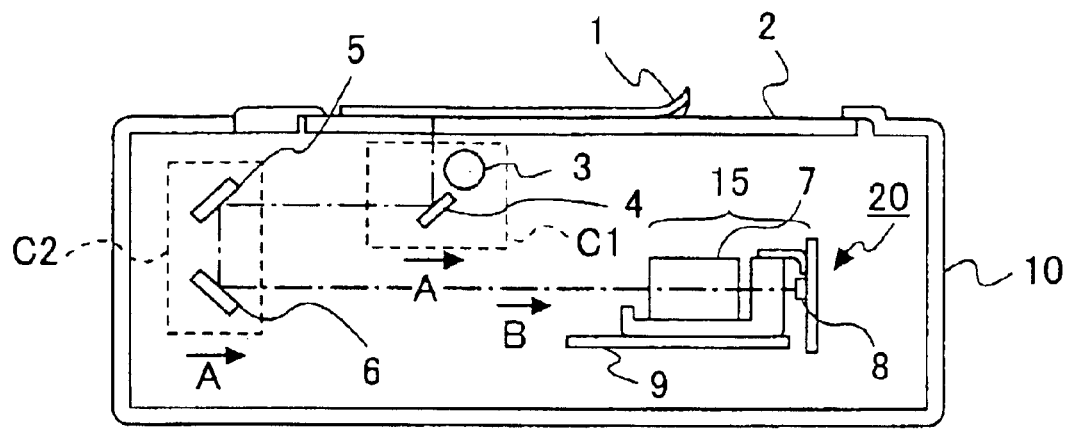
FIG. 3 illustrates an example of the image reader according to an embodiment of the invention.

FIG. 3 illustrates an image reader, which may be assembled as the image reading unit 35 into the DPPC shown in FIG. 1, or alternatively, it may comprises an independent image scanner.

Image reader includes a contact glass 2 on which an original 1 is placed, a first carriage C1 having an exposure lamp 3 and a first mirror 4 in a single unit, and a second carriage C2 for guiding the light image reflected from the original 1 and output from the first carriage C1 toward a light-receiving unit 15.

The light-receiving unit 15 includes an imaging lens 7, an image sensor 8 consisting of a number of light-receiving elements, and a circuit board (not shown) for processing the output of the image sensor 8. These components are optically adjusted and arranged on a stay member (or a base) 9, which is then attached to the frame 10 of the image reader. The stay member 9 and the light-receiving unit 15 loaded on the stay member 9 constitute a light-receiving block 20. The stay member 9 is a long and narrow plate with both ends in the longitudinal direction fixed to the frame 10. The width of the stay member 9 is selected so as to reliably hold the light-receiving unit 15.

In operation, the first carriage C1 is moved along the arrow A to scan the original 1 while illuminating the original with the exposure lamp 3. The light reflected from the original 1 is further reflected by the first mirror 4 toward the second carriage C2. The second mirror 5 and the third mirror 6 in the second carriage C2 guide the light to the light-receiving unit 15 as indicated by the dashed line. During the scanning, the second carriage C2 also moves in the direction indicated by the arrow A so as to maintain the light path length constant. The light is focused on the light-receiving surface of the image sensor 8 by the imaging lens 7. The image sensor 8 converts the light image into electric signals, and outputs imaging signals.

During the scan, the light-receiving unit 15 must keep its position fixed with respect to the scan beam to read the original image correctly. However, since the light-receiving unit 15 is loaded on the long and narrow stay member 9, it is easily affected by external shock or impact applied to the image reader and propagating through the frame 10 unless counter-measures are taken.

Figure 4:
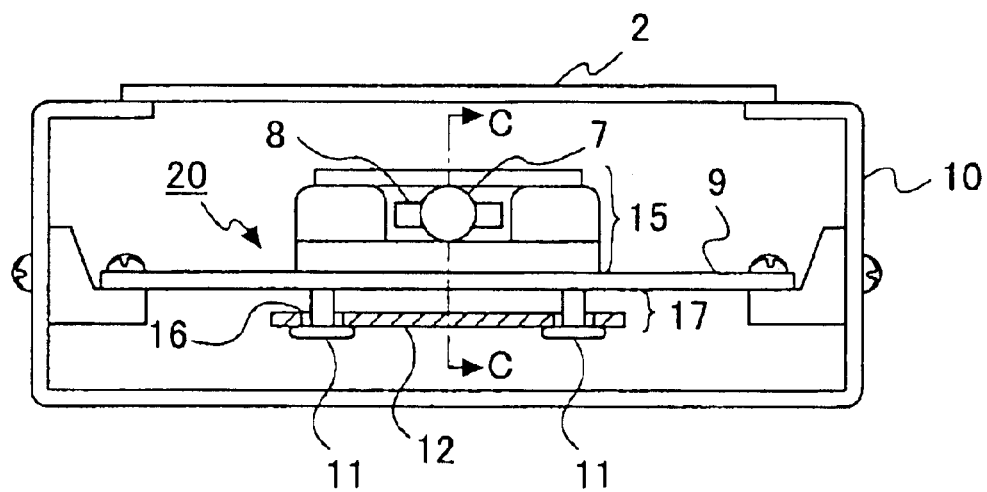
FIG. 4 illustrates a vibration absorbing structure used in the image reader shown in FIG. 3.

FIG. 4 illustrates a major part of the image reader according to an embodiment. In the example shown in FIG. 4, a balance weight 12 is held by a balance-weight holding structure 17 in an unrestrained manner with respect to the stay member 9. Without the balance weight 12, the long stay member 9 oscillates with both ends fixed to the frame 10 as nodes, and the relative position between the image sensor 8 and the scan beam changes. This results in, non-uniformity and deterioration of the reproduced image.

Unlike the conventional technique of fixing the balance weight directly onto the stay member 9, the balance weight 12 shown in FIG. 4 is held from below in an unrestrained manner with respect to the stay member 9 so that the balance weight 12 adds a load to the stay member 9 in the gravitational direction, but does not directly act on the light-receiving block 20.

In the example shown in FIG. 4, the balance-weight holding structure comprises pins 11, each having a flange, and holes 16 formed in the balance weight 12 corresponding to the pins 11. Each hole 16 receives the associated pin 11. The diameter of the hole 16 is greater than that of pin 11, and smaller than that of the flange. (The hole 16 is a so-called idling hole). The length of the pin 11 is greater than the thickness of the balance weight 12 so as to produce an air gap between the bottom face of the stay member 9 and the top face of the balance weight 12. With this arrangement, the balance weight 12 can be held by the flange of the pin 11 in an unrestrained manner. This unrestrained holding of the balance weight has an advantageous shock absorbing effect.

If the stay member 9 starts oscillating and bends upward in response to the external vibration or impact propagating through the frame 10, the balance weight 12 gives the gravitational pull against the upward force that causes the vertical oscillation of the stay member 9. This gravitational pull prevents the stay member 9 from being displaced upward. On the other hand, when the stay member 9 bends downward, the balance weight 12 does not positively act on the stay member 9 because of the unrestrained holding structure. Displacement of the light-receiving unit 15 relative to the scan beam is greatly reduced, and consequently, adverse influence on image reading can be sufficiently eliminated.

Figure 5:
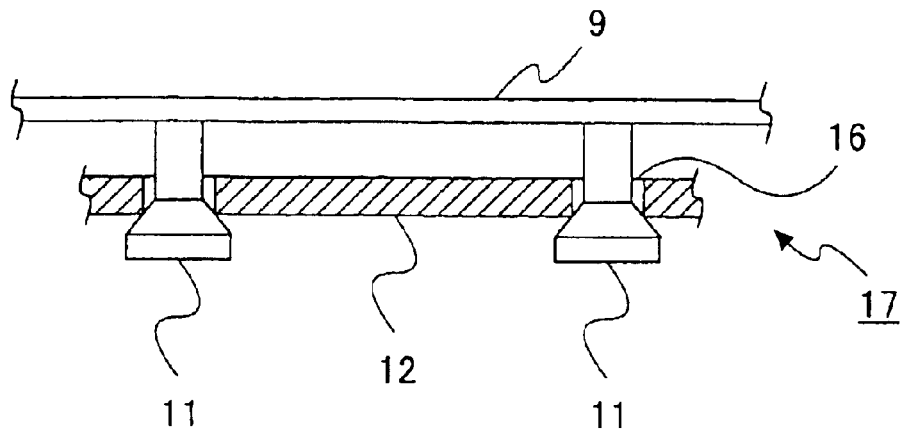
FIG. 5 illustrates an example of the balance-weight holding structure used in the image reader shown in FIG. 4.

FIG. 5 illustrates a modification of the balance-weight holding structure 17, in which pin 11 has a conical head. By making the head of the pin 11 conical, positioning of hole 16 of the balance weight 12 with respect to the pin 11 becomes stable, while still keeping the clearance between the pin 11 and the hole of the balance weight 12. The stable positioning of the balance weight 12 allows stable operation under various conditions, such as the mass of the balance weight 12 or the load on the stay member 9.

Figure 6A:
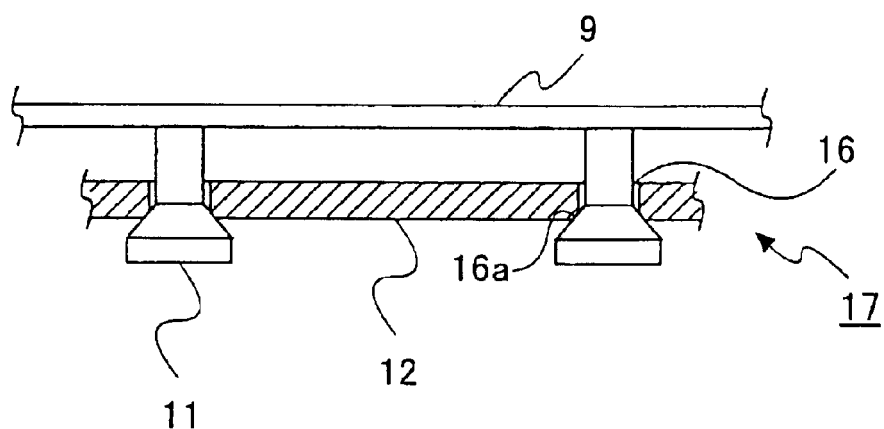
FIG. 6A illustrates another example of the balance-weight holding structure used in the image reader shown in FIG. 4.
Figure 6B:
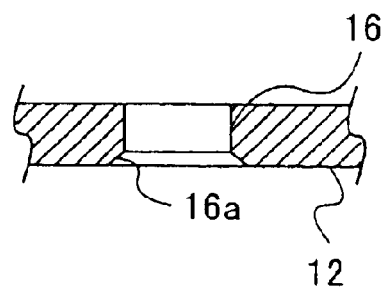
FIG. 6B is a cross-sectional view of a hole formed in the balance weight.

FIGS. 6A and 6B illustrate another modification of the balance-weight holding structure 17, in which the pin 11 has a conical head and the hole 16 of the balance weight 12 has a chamfer (conically chamfered face) 16a at the bottom of the balance weight 12, as shown in FIG. 6B. The outer face of the conical head of the pin 11 is received by the chamfered face 16a of the associated hole 16 of the balance weight 12, while still keeping the clearance between the pin 11 and the hole of the balance weight 12, as illustrated in FIG. 6A. This arrangement further improves stable positioning of the balance weight 12.

Figure 7:
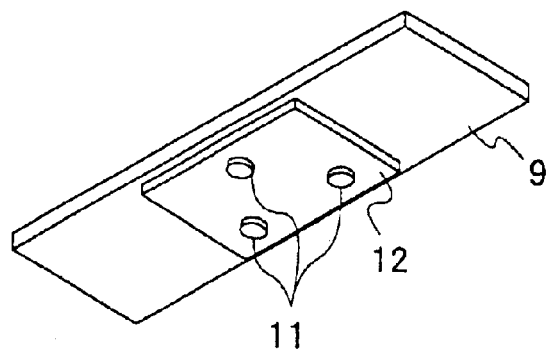
FIG. 7 illustrates an example of a pin arrangement of the balance-weight holding structure.

FIG. 7 illustrates an example of positional arrangement of pin 11 for holding the balance weight 12 with respect to the stay member 9. In this example, three pins 11 arranged as apexes of a triangle hold the balance weight 12 with their flanges with respect to the stay member 9. This three-pin arrangement prevents the balance weight 12 from floating with respect to the flange of an arbitrary pin 11, and allows the flanges of the pins 11 to support the balance weight 12 from below in a reliable manner with an air gap between the balance weight 12 and the stay member 9. If four or more pins 11 are used to hold the balance weight 12, the balance weight 12 is likely to float on the flange of at least one pin. The floating portion of the balance weight 12 rattles when an impact is applied externally to the image reader, which may reduce the shock-absorbing ability, of the balance-weight holding structure of the invention. In contrast, the three-pin structure can effectively prevent the balance weight 12 from floating or rattling, and guarantee the shock-absorbing ability.

Figure 8:
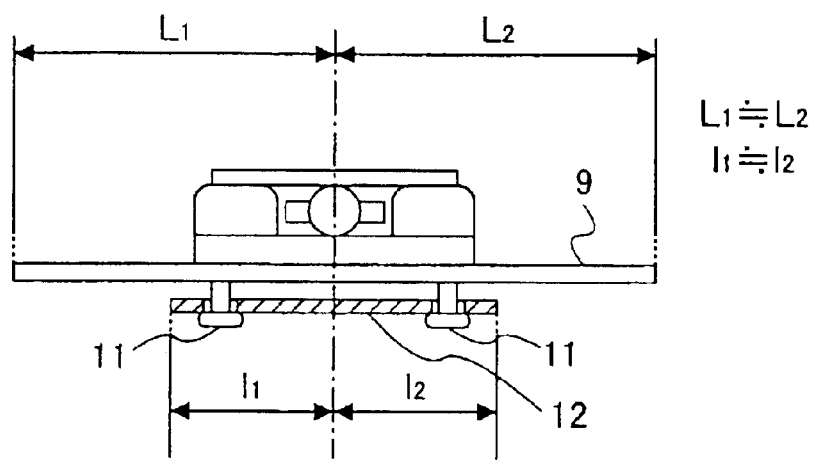
FIG. 8 illustrates an example of the optimum arrangement and the dimensions of the light-receiving block including the balance weight used in the image reader.

FIG. 8 illustrates an example of positional arrangement and the dimensions of the balance weight 12 with respect to the stay member 9 that supports the light receiving unit 15. In general, the oscillation of the stay member 9 with both ends fixed as nodes is the first order oscillation. Accordingly, the center of the stay member 9 becomes the crest of the first order standing wave, and the length L1 from the center to one end is substantially or nearly equal to the length L2 from the center to the other end of the stay member 9 (L1≈L2). The balance weight 12 is positioned so that the center of the balance weight 12 comes into agreement with the center of the stay member 9. The length l1 from the center to one end of the balance weight 12 along the longitudinal axis is also substantially or nearly equal to the length l2 from the center to the other end (l1≈l2). Positions of the pins 11 and the holes of the balance weight 12 are also selected so that the center of the balance weight 12 substantially agrees with the center of the stay member 9.

Since the balance weight 12 is provided at a position corresponding to the crest of the oscillation at which the displacement becomes maximum, vibration of the stay member 9 is prevented most effectively.

Figure 9:
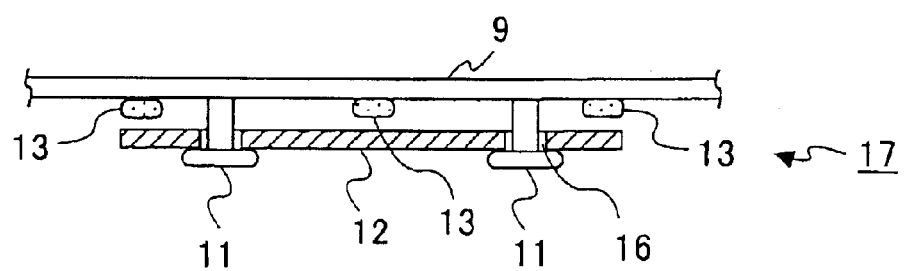
FIG. 9 illustrates another example of the balance-weight holding structure using a shock absorber.

FIG. 9 illustrates still another example of the balance-weight holding structure 17, in which shock absorbers 13 are inserted between the balance weight 12 and the stay member 9 so as not to disturb the unrestrained holding state. In other words, even if the shock absorbers 13 are inserted, the condition where the flange of the pin 11 supports the balance weight 12 in the unrestrained state with respect to the stay member 9 is satisfied.

The shock absorbers 13 are inserted for the purpose of preventing the balance weight 12 from hitting the stay member 9 and breaking. In general, the balance weight 12 is made of a metal because as the specific gravity increases, the dimensions of the balance weight 12 can be reduced. Steel plate or stainless steel plate is appropriately used because these materials have a substantially large specific gravity and are commercially available inexpensively. Using these materials, the balance weight 12 can be produced at a lower cost per unit weight as compared with other materials.

However, because the balance weight 12 is held in the unrestrained state, it may hit the flange (which is also made of a hard material, such as a metal) of the pin 11 or the stay member 9 during shipping or transportation, and may be damaged. By inserting the shock absorber 13, direct contact between the balance weight 12 and the stay member 9 is prevented, and the balance-weight holding structure is protected from damage.

Next, adjustment of the center of mass of the light-receiving block 20 will be explained with reference to FIG. 10, which is a cross-sectional view of the light receiving block 20 taken along the C—C line shown in FIG. 4. In the example shown in FIG. 10, the center of mass of the light-receiving block 20 is shifted from Gb back to the appropriate point Ga by adjusting the shape of the balance weight 12.

This arrangement is effective in overcoming the problem of the swinging mode due to offset of the center of mass from the center of the stay member 9. If the center of mass of the light-receiving block 20 resides at point Gb as in the conventional structure, rotation about the longitudinal axis of the stay member 9 is added to the oscillation, and as a result, the balance weight 12 can not effectively reduce the displacement of the light-receiving unit with respect to the scan beam.

To overcome this problem, the width of the balance weight 12' is extended in the direction opposite to the center of gravity Gb (indicated by the arrow) so that the balance weight 12' slightly projects from the edge of the stay member 9. The amount of projection is adjusted so that the center of mass Ga of the light-receiving block 20 substantially agrees with the center of the stay member 9. With the center of gravity Ga in agreement with the center of the stay member 9, the oscillation of the light-receiving block 20 is effectively reduced by the extended balance weight 12', without causing rotational swinging. The extended balance weight 12' is held by the flanges of the pins 11 in an unrestrained manner with respect to the stay member 9 with a clearance between the pins 11 and the holes 16 of the extended balance weight 12', as in the previous examples, to effectively absorb oscillation in the vertical direction.

Figure 10:
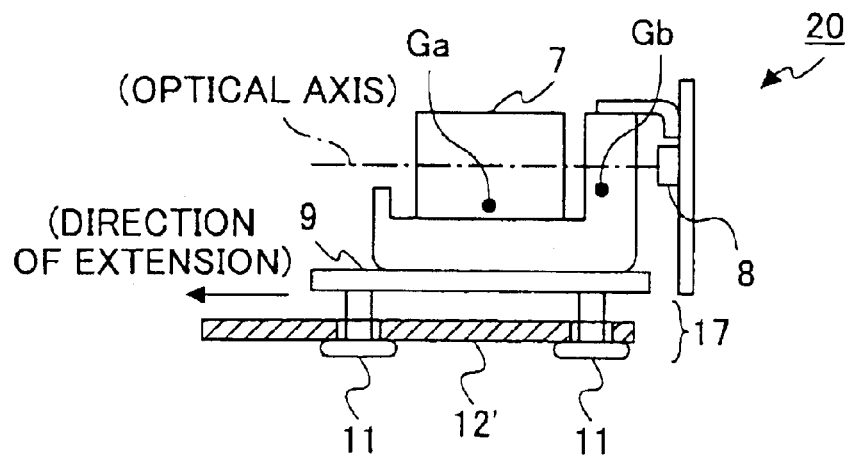
FIG. 10 is a cross-sectional view taken along the C—C line of FIG. 4, showing the center of mass shifted to the appropriate position by means of the balance weight.
Figure 16A:
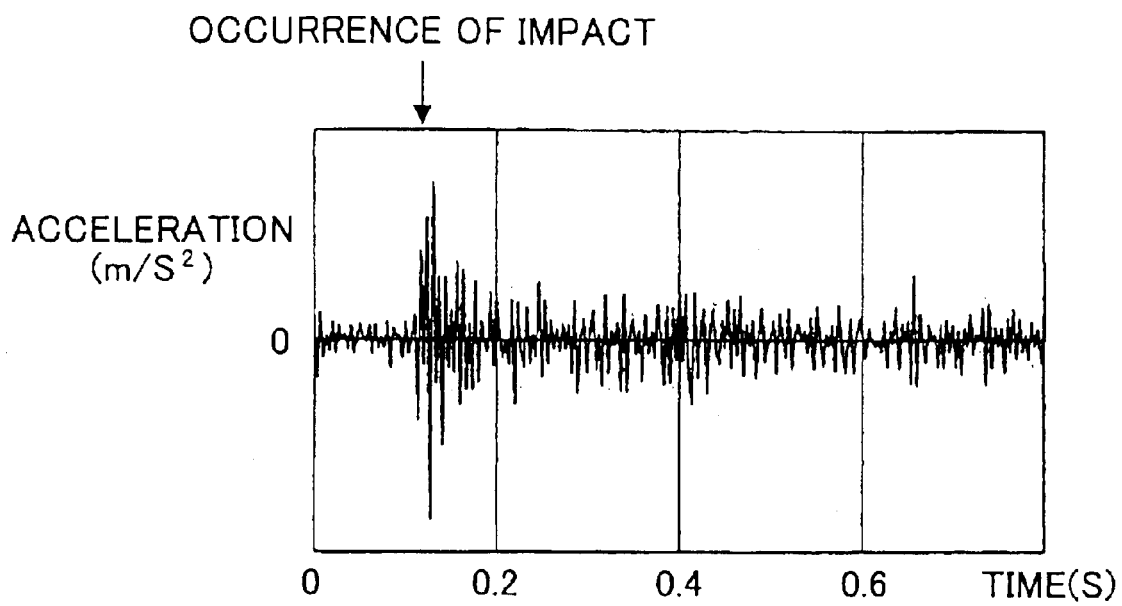
Figure 16B:
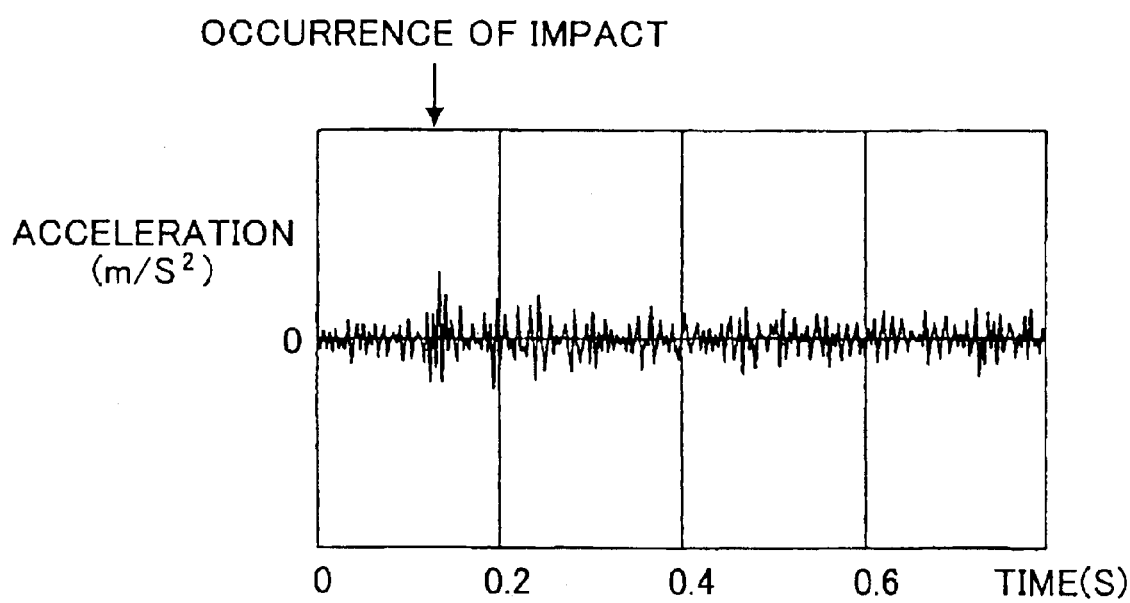
FIG. 16B shows the oscillation of the light-receiving block of the image reader with little peak according to the present invention.

The conspicuous effect of the arrangement of FIG. 10, as compared with the conventional structure, is shown in the graphs of FIGS. 16A and 16B. The horizontal axis denotes time (seconds), and the vertical axis denotes acceleration (m/sec$^2$). FIG. 16A shows the oscillation in the conventional image reader without means for reducing oscillation exhibiting big peaks when an impact is applied to the image reader. FIG. 16B shows the oscillation in the image reader having the well-balanced light-receiving block 20 shown in FIG. 10 according to an embodiment of the invention. The graph of FIG. 16B exhibits little peaks even if an impact is applied to the image reader. Such an impact occurs, for example, when a clutch is switched to start scanning by driving the first and second carriages C1 and C2. The impact propagates through the frame 10 of the image reader to the light-receiving block 20.

FIGS. 16A and 16B clearly show how the oscillation after the impact is reduced effectively by the well-balanced light-receiving block 20 with the weight holding structure shown in FIG. 10. The reproduced image from the output of the image sensor 8 is also improved. With the conventional image reader, periodic streaks appear in the reproduced image due to oscillation of the light-receiving unit. In contrast, undesirable streaks are not observed at all in the reproduced image when using the image reader having the light-receiving block 20 shown in FIG. 10.

Figure 11:
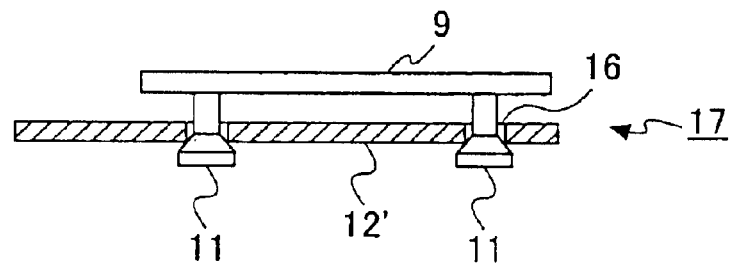
FIG. 11 illustrates an example of a balance-weight holding structure used in the image reader shown in FIG. 10.

FIG. 11 illustrates a modification of the balance-weight holding structure 17 shown in FIG. 10. The pin 11 has a conical head in place of the flange, as in the example shown in FIG. 5. This arrangement allows more stable positioning of the extended balance weight 12' with respect to the pin 11, and consequently, stable operation can be guaranteed under various conditions, such as changing the mass of the balance weight 12' or the load on the stay member 9.

The hole 16 of the extended balance weight 12' may have a conically chamfered face at the bottom of the balance weight 12' as shown in FIG. 6B. In this case, the outer face of the conical head of the pin 11 is received by the conically chamfered face of the hole 16 formed in the extended balance weight 12' shown in FIG. 10. With the combination of the conical head of the pin 11 and the conically chamfered hole 16 of the balance weight 12', positioning of the extended balance weight 12' becomes more stable, while keeping the clearance between the pin 11 and the hole 16 of the balance weight 12'.

Furthermore, it is preferable for the balance-weight holding structure 17 of FIG. 10 to have the three-pin arrangement shown in FIG. 7. This three-pin arrangement prevents the extended balance weight 12' from floating with respect to the flange of an arbitrary pin 11, and allows the flanges of the pins 11 to support the extended balance weight 12' from below in a reliable manner with an air gap between the stay member 9 and the extended balance weight 12'. If four or more pins 11 are used to hold the balance weight 12', the extended balance weight 12 is likely to float on the flange of at least one pin 11. The floating portion of the extended balance weight 12' rattles when an impact is applied externally to the image reader, which may reduce the shock-absorbing ability of the balance-weight holding structure 17 shown in FIG. 10. In contrast, the three-pin structure can effectively prevent the extended balance weight 12' from floating or rattling, and guarantee the shock absorbing ability.

The positional arrangement and the dimensions of the balance weight 12 shown in FIG. 8 is also applicable to the balance-weight holding structure 17 of FIG. 10 using the extended balance weight 12'. In this case, the extended balance weight 12' is positioned so that the center of the length of the extended balance weight 12' comes into agreement with the center of the length of the stay member 9. In this case, the lengths from the center of the stay member 9 to both ends become substantially equal (L1≈L2), and the length l 1 from the center to one end of the balance weight 12' along the longitudinal axis is also substantially or nearly equal to the length l 2 from the center to the other end (l 1≈l 2). Positions of the pins 11 and the holes 16 of the extended balance weight 12' are selected so that the lengthwise center of the balance weight 12' substantially agrees with the center of the stay member 9.

Since the extended balance weight 12' is provided at a position corresponding to the crest of the oscillation at which the displacement becomes maximum, vibration of the light-receiving block 20 shown in FIG. 10 is prevented most effectively.

Figure 12:
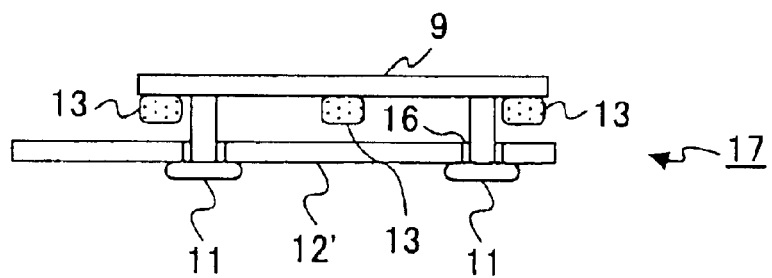
FIG. 12 illustrates another example of a balance-weight holding structure using a shock absorber used in the image reader shown in FIG. 10.

FIG. 12 illustrates another modification of the balance-weight holding structure 17 shown in FIG. 10. In this modification, shock absorbers 13 are inserted between the extended balance weight 12' and the stay member 9 so as not to disturb the unrestrained state, as in the example shown in FIG. 9. The condition where the flanges of the pins 11 support the extended balance weight 12' in the unrestrained state with respect to the stay member 9 is satisfied.

The shock absorbers 13 are inserted for the purpose of preventing the extended balance weight 12' from hitting the stay member 9 or the flange of the pin 11 during shipping or transportation. As has been described above, the extended balance weight 12' is preferably made of a metal, such as steel or stainless steel, because of its large mass per volume and because of commercial availability. The shock absorbers 13 protect the light-receiving block 20 shown in FIG. 10 from damage, while allowing the extended balance weight 12' to be held in the unrestrained state.

Figure 13:
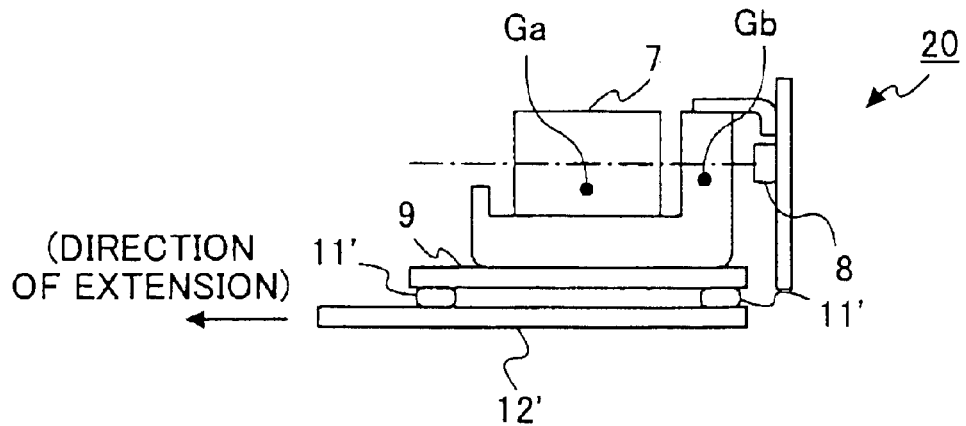
FIG. 13 illustrates still another example of a balance-weight holding structure using an adhesive for holding the balance weight used in the image reader of the present invention.

FIG. 13 illustrates still another example of the balance-weight holding structure used in the light-receiving block 20 with the extended balance weight 12'. In the example shown in FIG. 13, the balance-weight holding structure comprises adhesive 11' in place of the pins 11 and the holes 16 of the balance weight 12'. Of course, adhesive 11 may be replaced by rubber or foam material to hold the extended balance weight 12' with an air gap between it and the stay member 9.

If the stay member 9 starts oscillating and bends upward in response to an external vibration or impact propagating through the frame 10, the extended balance weight 12 held by the adhesive 11' below the stay member 9 gives the gravitational pull against the upward force acting on the stay member 9. This gravitational pull prevents the stay member 9 from being displaced upward. On the other hand, when the stay member 9 bends downward, the balance weight 12' held by the adhesive 11' with an air gap between the balance weight 12' and the stay member 9 does not positively act on the stay member 9.

Because the center of balance of the light-receiving block 20 is well-adjusted to position Ga, which substantially agrees with the center of the stay member 9 by means of the extended balance weight 12', undesirable rotation about the longitudinal axis of the stay member 9 is prevented. Thus, the extended balance weight 12' held by the adhesive 11' with air gap between the balance weight 12' and the stay member 9 can effectively reduce both vertical oscillation and rotational swinging of the light-blocking unit 20.

Displacement of the light-receiving unit relative to the scan beam is greatly reduced, and adverse influence on the reading operation can be eliminated.

Figure 14:
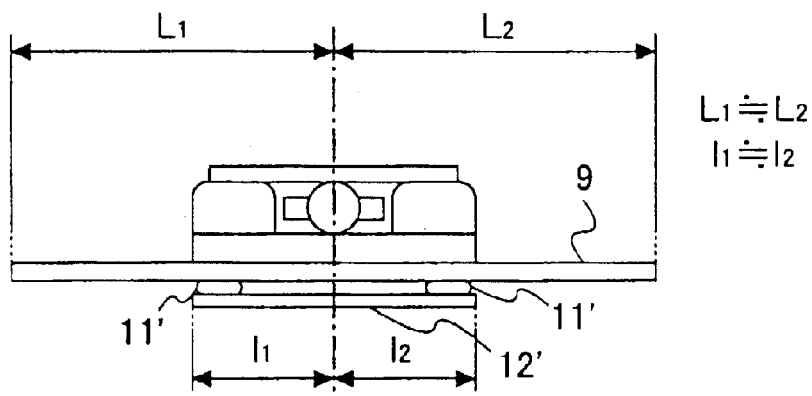
FIG. 14 illustrates the arrangement and the dimensions of the light-receiving block including the balance-weight holding structure shown in FIG. 13.

It is preferable for the balance-weight holding structure shown in FIG. 13 using the adhesive 11' to employ the positional arrangement and the dimensions of the balance weight shown in FIG. 14. In FIG. 14, the extended balance weight 12' is positioned so that the lengthwise center of the extended balance weight 12' comes into agreement with the center of the length of the stay member 9, as in FIG. 8. The lengths from the center of the stay member 9 to both ends become substantially equal (L1≈L2), and the length l 1 from the center to one end of the balance weight 12' along the longitudinal axis is also substantially or nearly equal to the length l 2 from the center to the other end (l 1 ≈l 2). Positions of the adhesive 11' are selected so that the lengthwise center of the balance weight 12' substantially agrees with the center of the stay member 9.

With this arrangement, the extended balance weight 12' is positioned where the amplitude of the oscillation becomes maximum (crest), and therefore, the vertical oscillation is effectively reduced.

Figure 15:
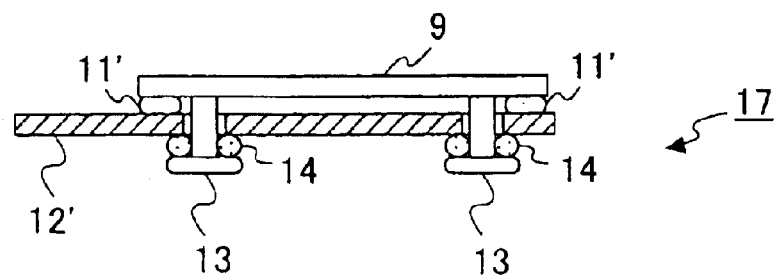
FIG. 15 illustrates still another example of a balance-weight holding structure using a shock absorber.

FIG. 15 illustrates yet another example of the balance-weight holding structure 17. In this example, a material having a large specific-gravity, such as steel or stainless steel is selected for the extended balance weight 12', and the extended balance weight 12' is held by pins 13 with flanges and adhesive 11'. The pins 13 and the adhesive 11' enhance the holding reliability each other, and at the same time, the adhesive 11' functions as a shock absorber between the balance weight 12' and the stay member 9. Furthermore, another shock absorber 14 is inserted between the flange of the pin 13 and the bottom of the balance weight 12' so as not to disturb the unrestrained state of the balance weight 12'. This arrangement prevents the extended balance weight 12' from hitting the stay member 9 and the flange of the pin 13 in a reliable manner, while maintaining the unrestrained state of the balance weight 12'.

In conclusion, the balance weight held in an unrestrained manner with respect to the stay member can reduce oscillation of the light-receiving unit in a reliable manner with a simple structure, even if a long and narrow stay member is used. Consequently, quality of the reproduced image is maintained high, preventing fluctuation or unevenness in the reading operation.

Because the center of mass of the light-receiving block is maintained at the center of the stay member, a swinging mode in which rotation is added to the vertical oscillation is prevented. By preventing undesirable rotation about the longitudinal axis of the stay member, the oscillation reduction effect is guaranteed.

If the balance weight is held by adhesive with an air-gap between it and the stay member, oscillation is reduced with a very simple structure.

Because the balance weight is held in an unstrained manner with respect to the stay member, the balance weight does not excessively act on the light-receiving block, other than reducing the upward oscillation.

By using a pin having a conical head in the balance-weight holding structure, positioning of the balance weight becomes more reliable, and stable operation is guaranteed.

By employing a three-pin structure, the balance weight is prevented from floating or rattling, and reliability in reading operation is guaranteed.

By placing the balance weight at the center of the stay member, at which the displacement becomes maximum, oscillation is effectively reduced.

By selecting a less expensive material having a large specific gravity as a plate-like balance weight, the balance weight can be attached in a narrow space, such as the bottom face of the stay member, as an oscillation reduction means at a low cost.

The image reader having the light-receiving block with the balance-weight holding structure described above is applicable to imaging apparatuses, such as photocopy machines, facsimile machines, and multi-function machines. In this case, the image reader exhibits the above-described effects, and can improve the performance of the imaging apparatuses.

Although the present invention has been described using specific examples, the invention is not limited to these examples, and there are many substitutions and modifications that can be made without departing from the scope of the invention.

This patent application is based on and claims the benefit of the earlier filing date of Japanese patent application No.

2001-172040 filed Jun. 7, 2001, the entire contents of which are hereby incorporated by reference.

What is claimed is:

1. An image reader comprising:
   a light source configured to illuminate an original;
   an optical guide system configured to guide a light beam reflected from the original and to convey information about an image on the original;
   a light-receiving unit configured to receive the light beam guided by the optical guide system and to convert the information about the image into electric signals;
   a stay member holding the light-receiving unit;
   a balance weight configured to act on the stay member and to reduce oscillation of the light-receiving unit; and
   a balance-weight holding structure configured to hold the balance weight in an unrestrained state relative to the stay member, the balance-weight holding structure comprising pins disposed in holes defined by the balance weight, lengths of the pins being greater than a thickness of the balance weight to provide a first air gap between the stay member and the balance weight, and diameters of the pins being less than diameters of the holes to provide second air gaps between the pins and inner faces of the holes.

2. The image reader according to claim 1, wherein the at least one of the pins comprises a flange having a diameter greater than the diameter of the hole in which the pin is disposed.

3. The image reader according to claim 1, wherein at least one of the pins comprises a conical head having a diameter greater than the diameter of the hole in which the pin is disposed.

4. The image reader according to claim 3, wherein the balance weight comprises a conically chamfered surface around the hole configured to receive an outer face of the conical head of the pin.

5. The image reader according to claim 1, wherein the balance weight is positioned at a center of the stay member.

6. An image reader comprising:
   a light source configured to illuminate an original;
   an optical guide system configured to guide a light beam reflected from the original and to convey information about an image on the original;
   a light-receiving block comprising:
      a light-receiving unit configured to receive the light beam guided by the optical guide system and to convert the information about the image into electric signals; and
      a stay member holding the light-receiving unit; and
   a balance weight provided to the stay member in an unrestrained manner and configured to bring a center of mass of the light-receiving block to a center of the stay member, the balance weight extending horizontally in a direction away from a center of gravity of the light-receiving unit beyond an edge of the stay member.

7. The image reader according to claim 6, further comprising:
   a balance-weight holding structure configured to hold the balance weight in the unrestrained state relative to the stay member.

8. The image reader according to claim 7, wherein the balance-weight holding structure comprises a pin configured to support the balance weight relative to the stay member with an air gap between the balance weight and the stay member.

9. The image reader according to claim 7, wherein the balance-weight holding structure comprises a pin including a flange, the pin disposed in a hole defined in the balance weight, a diameter of the hole being greater than a diameter of the pin and less than a diameter of the flange, the pin supporting the balance weight relative to the stay member with an air gap between the balance weight and the stay member.

10. The image reader according to claim 7, wherein the balance-weight holding structure comprises a pin including a conical head, the pin disposed in a hole defined in the balance weight, a diameter of the hole being greater than a diameter of the pin and less than a diameter of the conical head, the pin supporting the balance weight relative to the stay member with an air gap between the balance weight and the stay member.

11. The image reader according to claim 10, wherein the balance weight comprises a conically chamfered surface around the hole configured to receive the an outer face of the conical head of the pin.

12. The image reader according to claim 6, wherein the balance weight is positioned at the a lengthwise center of the stay member.

13. A light-receiving block comprising:
   a light-receiving unit comprising an imaging lens and a light-receiving element, the imaging lens configured to focus a light image on the light-receiving element, and the light-receiving element configured to convert the light image into electric signals;
   a stay member holding the light-receiving unit;
   a balance weight; and
   a balance-weight holding structure configured to hold the balance weight in an unrestrained state relative to the stay member, the balance-weight holding structure comprising pins disposed in holes defined by the balance weight, lengths of the pins being greater than a thickness of the balance weight to provide a first air gap between the stay member and the balance weight, and diameters of the pins being less than diameters of the holes to provide second air gaps between the pins and inner faces of the holes.

14. A light-receiving block comprising:
   a light-receiving block comprising:
      a light-receiving unit comprising an imaging lens and a light-receiving element, the imaging lens configured to focus a light image on the light-receiving element, and the light-receiving element configured to convert the light image into electric signals; and
      a stay member holding the light-receiving unit;
   a balance weight; and
   a balance-weight holding structure configured to hold the balance weight in an unrestrained state relative to the stay member so that a center of mass of the light-receiving unit corresponds to a center of the stay member the balance weight extending horizontally in a direction away from a center of gravity of the light-receiving unit beyond an edge of the stay member.

15. An imaging apparatus comprising:
   an image reader configured to read an image on an original and to output an imaging signal; and
   an imaging unit configured to receive the imaging signal from the image reader and to reproduce the image read from the original, the image reader comprising:
      a light source configured to illuminate the original;
      an optical guide system configured to guide a light beam reflected from the original and to convey information about the image on the original;

a light-receiving unit configured to receive the light beam guided by the optical guide system and to convert the information about the image into electric signals;

a stay member holding the light-receiving unit;

a balance weight configured to act on the stay member and to reduce oscillation of the light-receiving unit; and a balance-weight holding structure configured to hold the balance weight in an unrestrained state relative to the stay member, the balance-weight holding structure comprising pins disposed in holes defined by the balance weight, lengths of the pins being greater than a thickness of the balance weight to provide a first air gap between the stay member and the balance weight, and diameters of the pins being less than diameters of the holes to provide second air saps between the pins and inner faces of the holes.

16. The imaging apparatus according to claim 15, wherein at least one of the pins comprises a flange having a diameter greater than the hole in which the pin is disposed.

17. The imaging apparatus according to claim 15, wherein at least one of the pins comprises a conical head having a diameter greater than the diameter of the hole in which the pin is disposed.

18. An imaging apparatus comprising:

an image reader configured to read an image on an original and to output an imaging signal;

an imaging unit configured to receive the imaging signal from the image reader and to reproduce the image read from the original, the image reader comprising:

a light source configured to illuminate the original;

an optical guide system configured to guide a light beam reflected from the original and to convey information about an the image on the original;

a light-receiving block comprising:

a light-receiving unit configured to receive the light beam guided by the optical guide system and to convert the information about the image into electric signals; and a stay member holding the light-receiving unit; and a balance weight provided to the stay member in an unrestrained state and configured to bring a center of mass of the light-receiving block to a center of the stay member, the balance weight extending horizontally in a direction away from a center of gravity of the light-receiving unit beyond an edge of the stay member.

19. An image reader comprising:

irradiating means for irradiating an original;

optical guide means for guiding a light beam reflected from the original and for conveying information about an image on the original;

light-receiving means for receiving the light beam guided by the optical guide means and for converting the information about the image into electric signals;

first holding means for holding the light-receiving means;

weighting means for acting on the first holding means and for reducing oscillation of the light-receiving means; and second holding means for holding the weighting means in an unrestrained state relative to the first holding means, the second holding means comprising pins disposed in holes defined by the weighting means, lengths of the pins being greater than a thickness of the weighting means to provide a first air gap between the first holding means and the weighting means, and diameters of the pins being less than diameters of the holes to provide second air gaps between the pins and inner faces of the holes.

20. An image reader comprising:

irradiating means for irradiating an original;

optical guide means for guiding a light beam reflected from the original and conveying information about an image on the original;

a light-receiving block comprising:

light-receiving means for receiving the light beam guided by the optical guide means and for converting the information about the image into electric signals; and first holding means for holding the light-receiving means; and weighting means provided to the first holding means in an unrestrained manner, the weighting means extending horizontally in a direction away from a center of gravity of the light-receiving means beyond an edge of the first holding means.

21. A light-receiving block comprising:

light-receiving means comprising an imaging lens and a light-receiving element, the imaging lens configured to focus a light image on the light-receiving element, and the light-receiving element configured to convert the light image into electric signals;

first holding means for holding the light-receiving means;

weighting means; and second holding means for holding the weighting means in an unrestrained state relative to the first holding means, the second holding means comprising pins disposed in holes defined by the weighting means, lengths of the pins being greater than a thickness of the weighting means to provide a first air gap between the first holding means and the weighting means, and diameters of the pins being less than diameters of the holes to provide second air gaps between the pins and inner faces of the holes.

22. A light-receiving block comprising:

a light-receiving means comprising an imaging lens and a light-receiving element, the imaging lens configured to focus a light image on the light-receiving element, and the light-receiving element configured to convert the light image into electric signals;

first holding means for holding the light-receiving means;

weighting means; and second holding means for holding the weighting means in an unrestrained state relative to the first holding means such that the weighting means extends in a direction away from a center of gravity of the light-receiving means beyond an edge of the first holding means.

23. An imaging apparatus comprising:

an image reader configured to read an image on an original and to output an imaging signal; and an imaging unit configured to receive the imaging signal from the image reader and to reproduce the image read from the original, the image reader comprising:

irradiating means for irradiating an original;

optical guide means for guiding a light beam reflected from the original and for conveying information about an image on the original;

light-receiving means for receiving the light beam guided by the optical guide means and for converting the information about the image into electric signals;

first holding means for holding the light-receiving means;

weighting means for acting on the first holding means and for reducing oscillation of the light-receiving means; and second holding means for holding the weighting means in an unrestrained state relative to the first holding means, the second holding means comprising pins disposed in holes defined by the weighting means, lengths of the pins being greater than a thickness of the weighting means to provide a first air gap between the first holding means and the weighting means, and diameters of the pins being less than diameters of the holes to provide second air gaps between the pills and inner faces of the holes.

24. An imaging apparatus comprising:

an image reader configured to read an image on an original and to output an imaging signal;

an imaging unit configured to receive the imaging signal from the image reader and to reproduce the image read from the original, the image reader comprising:

irradiating means for irradiating an original;

optical guide means for guiding a light beam reflected from the original and conveying information about an image on the original;

a light-receiving block comprising:

light-receiving means for receiving the light beam guided by the optical guide means and for converting the information about the image into electric signals; and first holding means for holding the light-receiving means; and weighting means provided to the first holding means in an unrestrained manner, the weighting means extending horizontally in a direction away from a center of gravity of the light-receiving means beyond an edge of the first holding means.

25. An image reader comprising:

a light source configured to illuminate an original;

an optical guide system configured to guide a light beam reflected from the original and to convey information about an image on the original;

a light-receiving unit configured to receive the light beam guided by the optical guide system and to convert the information about the image into electric signals;

a stay member configured to hold the light-receiving unit;

a balance weight configured to act on the stay member and to reduce oscillation of the light-receiving unit; and a balance-weight holding structure configured to hold the balance weight in an unrestrained state relative to the stay member, the balance-weight holding structure contacting a portion of a bottom face of the balance weight to support the balance weight in a gravitational direction such that an air gap is disposed between a top face of the balance weight and the stay member.

* * * * *